Nov. 4, 1958    K. K. HIGGINS    2,858,646
ORCHARD HEATER

Filed Nov. 21, 1955    2 Sheets-Sheet 1

KENNETH K. HIGGINS
INVENTOR
HUEBNER, BEEHLER,
WORREL & HERZIG
ATTORNEYS

Nov. 4, 1958 K. K. HIGGINS 2,858,646
ORCHARD HEATER
Filed Nov. 21, 1955 2 Sheets-Sheet 2

KENNETH K. HIGGINS
INVENTOR
HUEBNER BEEHLER
WORREL & HERZIG
ATTORNEYS
BY
Richard M. Worrel United States Patent Office 2,858,646
Patented Nov. 4, 1958

2,858,646

ORCHARD HEATER

Kenneth K. Higgins, Gilroy, Calif., assignor to Air-O-Fan Products Corporation, Gilroy, Calif.

Application November 21, 1955, Serial No. 548,054

7 Claims. (Cl. 47—2)

The present invention relates to orchard heaters and more particularly to an apparatus adapted for earth traversing movement having facilities for heating and discharging large masses of air over growing crops and the like.

Many tender crops are grown in areas in which occasional brief periods of cold weather subject the plants to temperatures below their tolerances and result in crop and even plant destruction. This is particularly true of sub-tropical fruits such as oranges, grapefruit, lemons, mangoes, avocados and the like. Smaller plants such as tomatoes, egg plants, peppers and other truck crops are likewise damaged by cold weather, sometimes even though protected by hot caps and other coverings. There are also various so-called hardy crops which cannot withstand low temperatures at particular seasons of bloom, fruit maturity or the like.

In order to avoid frost damage, it has been known to utilize smudge pots and orchard heaters. The former have discharged vast quantities of smoke with the intention of providing a smoke blanket to retain the heat radiating from the earth. While smudge pots release some heat, that has not been their principal function and the smoke discharged has been disagreeable to people living in the area of smudging and has soiled and thus reduced the quality of growing crops. Orchard heaters have usually been stationary, required extensive duplication in order to cover any extensive area, demanded close supervision to insure proper operation, required frequent refueling and have been incapable of general ignition throughout the orchard at the most advantageous moment. Further, both smudge pots and stationary orchard heaters have required considerable investment because of the number normally required; much labor in distributing, collecting and servicing; and in many instances have been so onerous that farmers have accepted the calculated risk of damage or destruction of the crops rather than to incur the trouble and expense of utilizing such protective measures.

There have also been mobile orchard heaters consisting of movable heating units circulated by trucks or tractors driven through the orchards or other crops during times of excessively low temperatures. Previous to the present invention, however, they have tended to be too bulky for convenient orchard use or, have been easily used, but insufficient in their heating effect. It is found that unless vast quantities of heated air can be widely distributed from such mobile heaters, they must be caused to traverse such closely adjacent reciprocal paths through an orchard that extensive coverage and protection is impossible. The manner in which the heated air is distributed has also been found to be of significance to effective operation. It has previously been the practice in mobile orchard heaters to discharge the heated air longitudinally of their direction of travel. This has, of course, excessively narrowed the effective swath of heating action. While this has been recognized as a difficulty, it has been regarded as an unavoidable problem unless excessively complex structures were adopted. The present invention has succeeded in providing lateral discharge of heated air, thus vastly increasing the swath of coverage, and has accomplished this with a structure which is of the utmost simplicity.

An object of the present invention is, therefore, to provide an improved mobile orchard heater.

Another object is to prevent loss or deterioration of crops as a result of cold temperatures.

Another object is to provide such a heater in which substantially greater quantities of air can be heated to higher temperatures in more compact apparatus for the purpose than previously thought possible.

Another object is to provide for the dissemination of heated air over wider swaths than previously accomplished by orchard heaters.

Another object is to provide an apparatus mounted for earth traversing movement and adapted to discharge in opposite lateral directions transversely of the direction of movement.

Another object is to make possible the protection of orchard and field crops from excessively reduced temperatures in a more economical and effective manner.

Another object is to provide an apparatus adapted to draw in air longitudinally thereof, to heat the air drawn in, and to discharge the heated air laterally outwardly thereof.

Another object is to minimize the labor required for conventional orchard heating purposes and the care of the equipment employed.

Another object is to minimize the capital investment usually required for effective orchard heating equipment.

A further object is to make available a more effective and dependable orchard heater.

Still further objects and advantages will become apparent in the subsequent description in the specification.

In the drawings:

Fig. 3 is a somewhat enlarged transverse section taken on line 3—3 of Fig. 1.

Fig. 4 is a somewhat enlarged transverse section taken on line 4—4 of Fig. 1.

Figure 1:
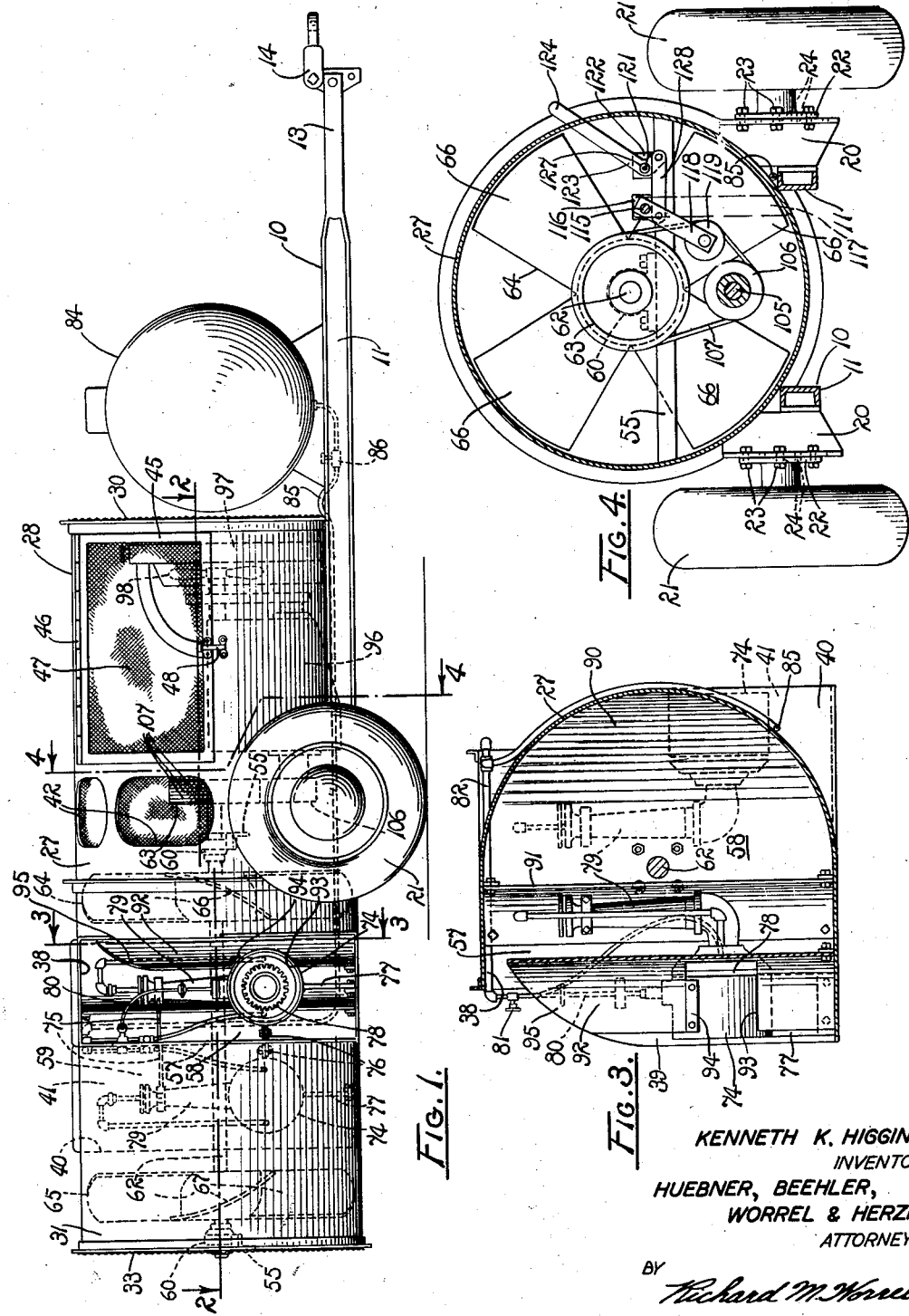
Fig. 1 is a side elevation of an orchard heater embodying the principles of the present invention.

Referring more particularly to the drawings:

The orchard heater of the present invention provides a substantially horizontally disposed support frame 10 including a pair of spaced longitudinal frame members 11 interconnected by front and rear transverse frame members, not shown. A drawbar 13 is forwardly extended from the front of the frame, and a hitch 14 is shown connected to the drawbar to enable attachment of the drawbar to a draft appliance, such as a tractor, truck or the like, also not shown.

Frame plates 20 are extended laterally outwardly from a central portion of the longitudinal frame members 11 and ground engaging support wheels 21 are journalled for rotation on wheel plates 22. The wheel plates are connected to the frame plates extended through apertures, as 24, provided for the purpose so that the wheels are in axial alignment on opposite sides of the frame. The frame and wheel plates are then adapted to be adjusted elevationally thereby to raise and lower the frame on the wheels. When movement is imparted to the frame through the drawbar 13, the wheels guide the frame in a predetermined forward path of travel normal to the axis of rotation of the wheels as is well known in trailers.

An elongated substantially cylindrical hollow housing 27 provides a longitudinal axis and is mounted on the frame 10 with said axis disposed in alignment with the predetermined direction of movement of the frame. The housing has a front portion 28 extended forwardly of the wheels providing an air inlet opening 29 covered by a substantially circular foraminous screen 30. The housing also has a rear end portion 31 rearwardly extended behind the wheels providing a rear air inlet opening 32 likewise covered by a foraminous screen 33. A plurality of circular reinforcing rims 34 circumscribe the housing and at each end the screens are preferably releasably connected to these rims.

Further the housing 27 has a tangentially formed laterally extended forward air duct 38 providing a front discharge opening or outlet 39. The housing also has a similarly formed laterally extended rear air duct 40 providing a rear discharge opening 41. Additionally, the housing has central screened windows 42 enabling observation of the interior of the housing by the operator but preventing leaves and other debris from falling into the housing. The housing has a forward access opening 44 over which is provided a hood 45 connected to the housing by hinges 46 for pivotal movement between open and closed positions over the access opening. The hood has a screen 47 stretched therewithin, and a latch 48 is provided on the housing and the hood for enabling releasable attachment of the hood over the access opening.

Rear and intermediate transverse struts 55 are diametrically extended in substantially horizontal position within the housing 27 and rigidly secured thereto, as by welding. A substantially circular partition 57 is mounted in the housing intermediate the front and rear ends 28 and 31 and more specifically, between the front and rear lateral ducts 38 and 40. The partition divides the housing into substantially air-tight front and rear compartments 58 and 59 respectively including air inlet openings 29 and 32 and air discharge openings 39 and 41.

Front and rear bearings 60 are mounted on the transverse struts 55 in axial alignment with each other and with the axis of the housing 27. An intermediate bearing 61 is supported in the partition 57 also in axial alignment with the front and rear bearings. An elongated substantially horizontal shaft 62 is journalled in the bearings 60 and 61 providing a rearward end extended into the rear compartment and a forward end extended into the forward compartment and through the forward bearing forwardly of the transverse strut 55. A driven pulley 63 is secured to the forward end of the shaft, as best seen in Figs. 1 and 4.

Forward and rearward fans 64 and 65 are respectively secured to the forward and rearward ends of the shaft 62 in the forward and rearward compartments for rotation with the shaft. The forward fan provides blades 66 angled in such a manner that upon rotation of the shaft in a predetermined direction, clockwise as shown in Fig. 4, air is drawn inwardly of the housing 27 through the front inlet opening 29 and is discharged rearwardly thereof for passage out of the front discharge opening 41. The rearward fan provides a plurality of blades 67 angled oppositely to the blades 66 of the forward fan so that upon rotation of the shaft in said predetermined direction, that is clockwise as seen in Fig. 4, air is drawn inwardly through the rear air inlet opening 32 and discharged forwardly outwardly of the rear discharge opening 41. Therefore, both fans have inlet ends and outlet ends and they are mounted on the shaft with their inlet ends facing outwardly and with their outlet ends facing toward each other.

Heaters 74 are mounted in the compartments 58 and 59 by means of substantially horizontal inner and outer brackets 75 and 76 secured to the partition 57 and substantially vertical support plates 77. The heaters are mounted in the lateral ducts 38 and 40 so as to intercept air blown through the ducts by the fans 64 and 65. The heaters provide burner units 78 and elongated mixing chambers 79. Gas lines 80 are connected to the burner units and include valves 81 for controllably delivering fuel to the burner units. An auxiliary feed line 82 is transversely extended over the top of the housing 27 and provides individual connections to the gas lines 80. The heaters are of a well known construction and inasmuch as they form no limiting part of the present invention, insofar as their details of construction are concerned, no further description thereof is made herein. It is to be understood that there are many types of heaters that can be suitably employed for the purpose. For the heaters of the present invention, however, a gas tank 84 is mounted on the forward portion of the frame 10 forwardly of the housing 27 and an elongated main feed line 85 interconnects the tank with the auxiliary line 82. A hand valve 86 is provided in the feed line for controlling the amount of gas being fed from the tank into the heaters. Petroleum gas maintained under liquifying pressure has proven excellently suited for use as a gas for the heaters.

Figure 2:
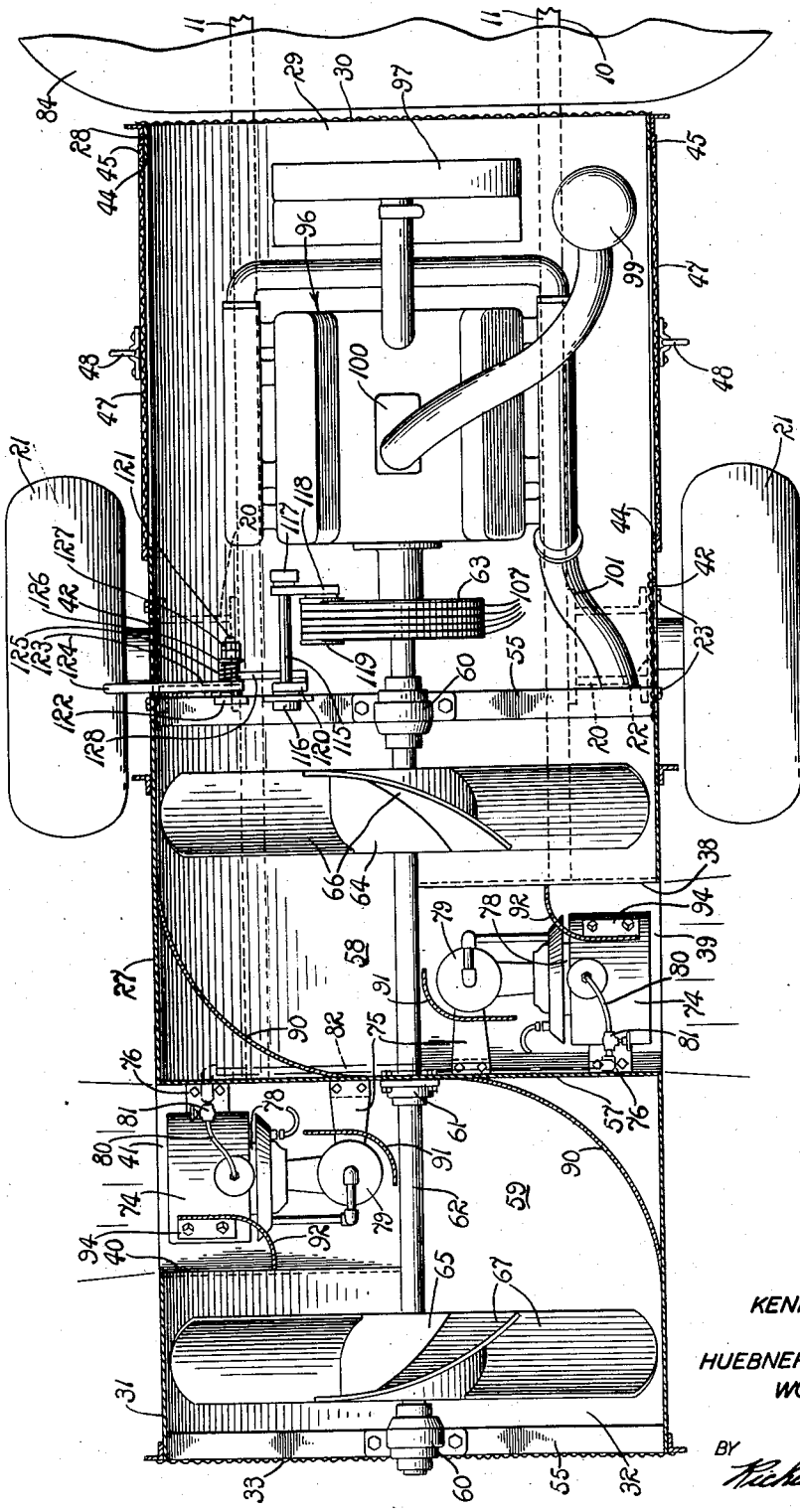
Fig. 2 is a fragmentary somewhat enlarged horizontal section taken on line 2—2 of Fig. 1.

Referring in particular to Fig. 2, main arcuate baffle plates or partitions 90 are mounted in substantially vertical positions in the housing 27 in the compartments 58 and 59. Each plate has a radius of curvature approximating that of the housing. The main baffle plates are shaped to fit the interior of the housing and are located in the compartments in such a manner as to guide air drawn into the housing by the fans 64 and 65 toward their respectively adjacent discharge openings 39 and 41. Inner and outer auxiliary baffle plates 91 and 92 are mounted in substantially erect positions in each of the lateral ducts 38 and 40 and are also curved in such a manner as to guide air from the fans outwardly of the ducts.

The outer auxiliary baffle plates 92 are secured to the bottom of the housing 27; provide central cut-outs 93 to fit their adjacent heater 74; include flanges 94 secured to their adjacent heaters; and have upper portions 95 curved outwardly against the ducts 38 and 40. The inner auxiliary baffle plates 91 are likewise secured to the top and bottom of the housing; have slots, not shown, fitted to the inner brackets 75; and are secured to the top of the housing.

A gasoline engine 96 or other motivating means is mounted forwardly within the housing 27 on the support frame 10 and constitutes a prime mover or powered drive means for imparting rotation to the shaft 62. Although the details of the engine are conventional and form no limiting part of the present invention, brief reference is made thereto for clarity in understanding the drawings. The engine thus includes, among other parts, a radiator 97, a fan 98, and air filter 99, a carburetor 100 and an exhaust pipe 101. The engine also has an output shaft 105 having a drive pulley 106 secured thereto. A plurality of pulley belts 107 circumscribe the drive pulley and the driven pulley 63 to impart rotation to the driven pulley incident to operation of the engine.

A shaft 115 is rotatably mounted at opposite ends in a bracket 116 on the central strut 55 and a vertically disposed post 117 upwardly extended in the housing 27. A link 118 is rigidly connected to the shaft and radially extended therefrom. A belt tightening pulley 119 is mounted on an extended end of the link and is positioned against the inside of the pulley belts 107, as best seen in Figs. 2 and 4.

An arm 120 is rigidly mounted on the shaft 115 on the opposite end thereof from the link 118 and is extended radially therefrom. A stud 121 is extended from a bracket 122 mounted on the central strut 55 in substantially parallel relation to the shaft. A bell crank lever 123 is rotatably mounted on the stud and provides a handle portion 124. A compression spring 125 is positioned against the bell crank around the stud, a washer 126 is positioned against spring, and lock nuts 127 are threadably fitted on the stud against the washer thereby to maintain the spring in compressing relation against the bell crank. A connecting rod 128 pivotally interconnects the arm and the bell crank lever. It will be evident that this arrangement enables tightening or loosening of the pulley belts 107. Thus, by pivoting the bell crank lever by manual movement of the handle portion 124, the shaft 115 is rotated to swing the link 118 thereby to urge the pulley 119 against the belts or to relieve pressure of the pulley against the belts. The spring 125 is adapted to maintain the bell crank lever in any position in which it is placed by the resultant frictional resistance to inadvertent displacement.

Operation

The operation of the described embodiment of the present invention is believed to be readily apparent and is briefly summarized at this point. In order to heat orchards, field crops and the like, the orchard heater is pulled therethrough by a tractor or other suitable prime mover. While an area to be heated can be covered in any suitable pattern, it is usual to progress in reciprocal parallel paths at such speeds and with the paths so spaced as to attain the extent of heating desired.

Before the apparatus is placed into use, however, the support frame 10 is elevationally adjusted on the wheels 21 by selectively positioning the bolts 23 in the proper apertures 24. The correct height of the housing 27 is to be determined, of course, by the elevation of the trees, or other crops, being treated. The tightener pulley 119 is then adjusted by handle 123 to give the proper tightness to the pulley belts 107. Also, the engine 96 is started, and gas is delivered to the heaters 74 by opening valves 81 and 86 and ignited to supply the heat desired.

During operation, the fans 64 and 65 are rotated in a clockwise direction, as seen in Fig. 4, by the engine 96 thereby to draw air through the open ends 28 and 32 of the housing 27 and to discharge air oppositely laterally from the housing through the ducts 38 and 40. Air passes from the fans into their respectively adjacent ducts, being guided therein by the baffle plate 90, 91 and 92. Air is thus passed over the heaters 74 and in so doing is warmed to a predetermined temperature.

In practice the heaters 74 may be operated on liquified petroleum gas and in one commercial form, each is adapted to emit 1,500,000 B. t. u.'s of heat. With a 130 H. P. engine 96 turning the shaft 62 at 1200 R. P. M., 60,000 cubic feet per minute of air is thrust out of each of the ducts. It has been found that the air is effectively projected laterally from the housing 125 feet on each side of the housing, thus encompassing a total swath of 250 feet as the apparatus is driven between the rows of trees or through field crops.

It is significant to note that the provision of two fans 64 and 65 concentrically mounted on a common shaft 62 having blades 66 and 67 oppositely angled to draw air inwardly from opposite ends 28 and 31 of the housing 27 substantially reduces axial thrusts on the bearings 60 and 61. Assuming the blades to be oppositely angled the same amount and of the same curvature, the axial forces imposed on the shaft by the blades are equal and opposite and therefore balance each other.

From the foregoing it will be understood that a highly effective mobile apparatus has been provided for heating orchard and field crops. The invention has broader utility in that it is also usable as a blower without the heaters 75, as for example in the shaking of rain water from early cherry crops and the like. In this regard, the fans 64 and 65 draw air inwardly longitudinally of the housing, as before, and discharge air laterally oppositely from the housing for shaking impact with the trees.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An orchard heater comprising an elongated substantially cylindrical hollow housing having openings in opposite ends thereof, means mounting the housing in substantially horizontal position for earth traversing movement longitudinally of the housing, a drive shaft journaled substantially concentrically in the housing, a pair of fans mounted concentrically on the shaft in spaced relation adapted to impel air axially oppositely of the housing when the shaft is rotated, means for rotating the shaft in a direction causing the fans to draw air inwardly from opposite ends of the housing and to impel it inwardly of the housing, the housing having oppositely laterally disposed discharge openings intermediate the fans, an arcuate air tight partition extended obliquely transversely of the housing and between the discharge openings with the housing defining air passages from each fan to a respective discharge opening, and a source of heat mounted in each air passage between its respective fan and discharge opening.

2. An orchard heater comprising an elongated hollow substantially cylindrical housing having open opposite ends, means mounting the housing in a substantially horizontal position for earth traversing movement along a line of travel substantially longitudinally thereof whereby the housing has relatively forward and rearward ends, an internal combustion engine mounted in the forward end of the housing the housing providing air passages past the engine longitudinally of the housing, a shaft having driven connection to the engine journaled concentrically in the housing, fans having opposite directions of thrust mounted concentrically on the shaft in axially spaced relation adapted to draw air endwardly into the housing past the internal combustion engine whereby the air is preheated, the housing having oppositely laterally disposed openings intermediate the fans, a substantially S-shaped partition mounted between the fans and between the laterally disposed openings directing air from the fans oppositely out the laterally disposed openings, and air heating means mounted within the housing intermediate the fans and their respective laterally disposed openings of the housing.

3. In a device of the character described, the combination of a substantially cylindrical housing having opposite open ends and a pair of oppositely laterally disposed openings, a substantially S-shaped partition extended transversely of the housing between the laterally disposed openings and with the housing defining separate air passages from each open end of the housing to a laterally disposed opening, a shaft journaled in the partition concentrically of the housing, means for rotating the shaft having driving connection to the shaft, and a pair of fans mounted on the shaft on opposite sides of the partition adapted to draw air in from the opposite ends of the housing for discharge out the laterally disposed openings upon shaft rotation.

4. An orchard heater comprising a substantially axially horizontal cylindrical housing mounted for longitudinal earth traversing movement, having a forwardly disposed open end, and a laterally disposed opening rearwardly spaced from the forward and; a shaft rotatably mounted substantially concentrically in the housing; an internal combustion engine mounted in the housing adjacent to the forward end thereof adapted to emit heat into the housing and having driving connection to the shaft; a fan mounted on the shaft rearwardly of the engine adapted to draw air into the housing through the forward end of the housing past the engine, to preheat the air and to project the air rearwardly in the housing; a partition in the housing for directing air from the fan out of the laterally disposed opening; and a source of heat mounted in the housing adjacent to the laterally disposed opening.

5. An orchard heater comprising an elongated hollow housing having openings in opposite ends thereof, means mounting the housing for earth traversing movement, a drive shaft journaled in the housing and extended longitudinally thereof, a pair of fans mounted on the shaft in spaced relation adapted to impel air axially oppositely of the housing when the shaft is rotated, means for rotating the shaft in a direction causing the fans to draw air inwardly from opposite ends of the housing and to impel it inwardly of the housing, the housing having oppositely laterally disposed discharge openings intermediate the fans, an arcuate air tight partition extended obliquely transversely of the housing between the discharge openings and with the housing defining air passages from each fan to a respective discharge opening, and a source of heat mounted in each air passage between its respective fan and discharge opening.

6. In a device of the character described, the combination of an elongated housing having opposite open ends and a pair of oppositely laterally disposed openings, a substantially S-shaped partition extended transversely of the housing between the laterally disposed openings and with the housing defining separate air passages from each open end of the housing to a laterally disposed opening, a shaft journaled in the partition and extended longitudinally of the housing, means for rotating the shaft having driving connection to the shaft, and a pair of fans mounted on the shaft with the partition disposed between the fans, the fans being adapted to draw air in from the opposite ends of the housing for discharge out the laterally disposed openings upon shaft rotation.

7. An orchard heater comprising an elongated housing mounted for longitudinal earth traversing movement, having a forwardly disposed open end, and a laterally disposed opening rearwardly spaced from the forward end; a shaft longitudinally extended and rotatably mounted in the housing; an engine mounted in the housing adjacent to the forward end thereof to emit heat during operation into the housing and having driving connection to the shaft; a fan mounted on the shaft rearwardly of the engine adapted to draw air into the housing through the forward end of the housing past the engine, whereby to preheat the air, and to project the air rearwardly in the housing; a partition in the housing for directing air from the fan out of the laterally disposed opening; and means mounted in the housing adjacent to the laterally disposed opening for heating air directed out the laterally disposed openings.

References Cited in the file of this patent

UNITED STATES PATENTS

| | | |
|---|---|---|
| 2,223,597 | Brewster | Dec. 3, 1940 |
| 2,236,475 | Findley | Mar. 25, 1941 |
| 2,564,257 | Herbster | Aug. 14, 1951 |
| 2,564,258 | Herbster | Aug. 14, 1951 |
| 2,590,109 | Lindenbaum | Mar. 25, 1952 |
| 2,602,267 | Neundorfer | July 8, 1952 |
| 2,608,441 | Daughtery | Aug. 26, 1952 |
| 2,617,406 | Herbster | Nov. 11, 1952 |
| 2,762,651 | Tuft | Sept. 11, 1956 |